United States Patent [19]
Weinstein

[11] 3,897,579
[45] July 29, 1975

[54] STARBURST PATTERN FOR FORMING PACKAGING LINERS AND PADS FROM SINGLE FACED CORRUGATED STOCK AND THE LIKE

[75] Inventor: David Weinstein, Baltimore, Md.

[73] Assignee: Maryland Cup Corporation, Owings Mills, Md.

[22] Filed: Aug. 21, 1973

[21] Appl. No.: 389,620

[52] U.S. Cl. .......... 428/13.4; 229/DIG. 7; 426/124; 428/179; 428/182
[51] Int. Cl............................ B32b 3/10; B32b 3/28
[58] Field of Search.................... 161/109, 110, 112; 229/DIG. 6, DIG. 7, DIG. 2; D59/2 A, 2 B; D96/8 A; 93/1 WZ, 53 P; 426/124

[56] References Cited
UNITED STATES PATENTS

| | | | |
|---|---|---|---|
| 2,314,435 | 3/1943 | Gutterman | 229/DIG. 7 |
| 2,321,519 | 6/1943 | Rubinoff | 229/DIG. 7 |
| 3,619,216 | 11/1971 | Weinstein | 426/124 X |

Primary Examiner—George F. Lesmes
Assistant Examiner—Alan T. McDonald
Attorney, Agent, or Firm—Birch and Birch

[57] ABSTRACT

A starburst pattern die is provided for cutting starburst patterns through one or more layers of sheet stock, in the formation of package liners or pads of the sheet stock for nestably receiving fragile articles in the starbursts. The starburst is characterized by an arcuate center cut with all but one of the rays of the pattern terminating at the circumference of the cut. The arcuate piece produced by the cut is integral with the remaining ray and together these resemble a keyhole shape which is retained in the starburst pattern to preclude the need for stripping any material from the cut starburst area during manufacture. The die for this pattern consists of a radially disposed keyhole shaped knife with a partially circular cutting edge at the center of the die and a plurality of radial knives butted to the resulting partial cylindrical outer wall portion of the keyhole knife and extending outwardly therefrom, all mounted in the face of a cylindrical base block.

4 Claims, 4 Drawing Figures

3,897,579

STARBURST PATTERN FOR FORMING PACKAGING LINERS AND PADS FROM SINGLE FACED CORRUGATED STOCK AND THE LIKE

This invention relates to die cutting of starburst patterns in one or more sheets of packaging liners or pads for frangible articles and more particularly to a new and novel starburst pattern for such sheets and a die therefor.

BACKGROUND OF THE INVENTION

Arrays of starburst patterns cut through sheet stock (paper or the like) packaging liners are commonly used as retaining means in packaging ice cream cones or other frangible articles wherein one or more layers of such liners are used to nestably receive articles through the cut starbursts and retain them in a safe condition within an outer package.

In the manufacture of such liners or pads the conventional starburst configuration is akin to a plurality of radial cuts intersecting at a single and very fine center point.

Several primary disadvantages result from such a starburst configuration in the volume production of package liners or pads.

First, the dies themselves must be of a finely honed intersecting construction which is subject to rapid wear and deterioration, requiring constant maintenance and undesirable down-time for the production machinery.

Further, when high speed rotary type cutting presses are used there is a tendency for incomplete cuts to result, whereby the starburst patterns do not readily open to nestably receive the fragile articles they are designed to protect within the package.

Removal of a complete circular area in the starburst is one method of alleviating the problem since it provides a die design with untapered radial rules or knives abutting the cylindrical sidewalls of a centered circular rule or knife, thus, materially enhancing the life and cutting ability of the die.

This die design and resulting starburst pattern have been found to be adequate and indeed, desirable, when used in a punch press with multiple layers of sheet stock stacked thereon to simultaneously have an array of starburst patterns cut therethrough, since the cut out central portions of the starburst are easily stripped out or otherwise removed from the finished liners or pads.

On the other hand, in high speed rotary die cutting machines, where, for example, a single continuous strip of single-faced corrugated stock is rapidly run through the die cutter, such a full cut out center portion provides a problem of stripping and collecting the cut out portion. Usually, the end result is a plethora of waste and trash in the production area with the attendant disadvantages of nuisance, additional maintenance and/or improperly stripped finished pads or liners. It has also been found that as the speed of production is increased these problems become magnified as well.

OBJECTS OF THE INVENTION

It is an object of the present invention to provide a new and novel starburst pattern for package liners or pads which enhances the efficiency of manufacture thereof.

It is another object of the present invention to provide a new and novel starburst pattern for package liners or pads which precludes the need for stripping scrap material from the finished products, and increases the speed of manufacture and obviates the problem of waste material in the production area.

Another object of the present invention is to provide a new and novel starburst pattern cutting die for the manufacture of package liners and pads from sheet stock.

These and other objects of the present invention will become more fully apparent with reference to the following specification and drawings which relate to a preferred embodiment of the invention.

SUMMARY OF THE INVENTION

The starburst die of the present invention comprises a "steel rule" die having a plurality of rules or cutting blades embedded on edge in a base block in the general configuration of a starburst pattern. The base block is a cylindrical section having a plurality of radially disposed rules or knives set in one face thereof, which rules or knives extend from the outer periphery of the die face into butting relationship with a partially cylindrical side periphery of a keyhole shaped rule or knife forming a partially cylindrical hub for the radial rules or knives in the center of the base block. Two additional radial rules or knives extending from opposite sides of the open arc of the hub complete the keyhole shape. Thus, in plan view, the cutting edges of the dies substantially resemble the spokes and hub of a wheel.

The resulting starburst configuration cut by the die in sheet stock consists of a partially punched out hole with radial slits extending therefrom in a symmetrical or predetermined array, thus providing a nestable socket or port through the sheet stock for the ready reception of objects therethrough. The punched out portion of the hole in the center of the pattern remains attached to one ray or leaf of the starburst and resembles the outline of a keyhole.

Thus, while a starburst pattern with a cut-out center portion is provided, no waste material is created in the production area during the die cutting thereof.

DETAILED DESCRIPTION OF THE INVENTION

Figure 1:
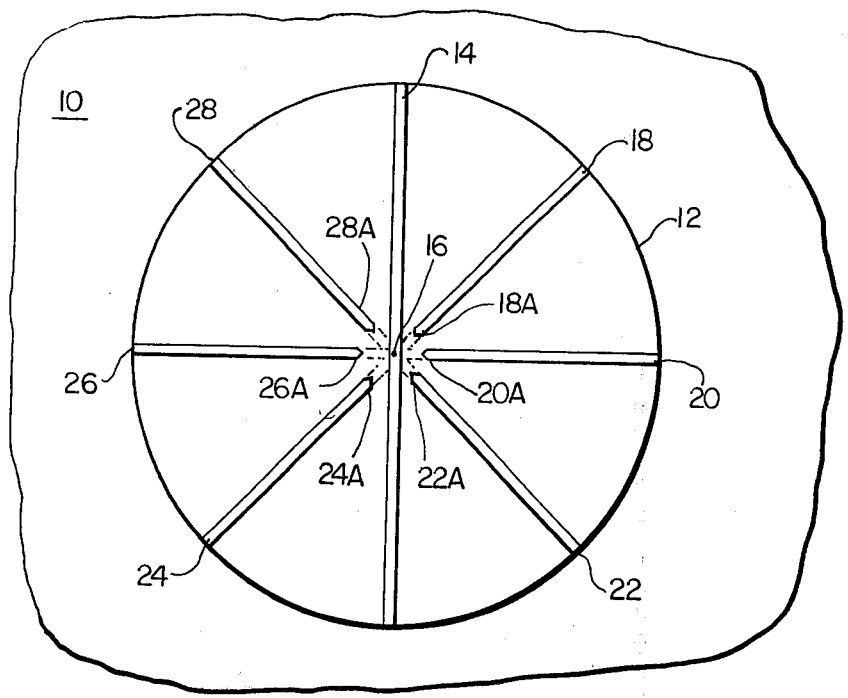
FIG. 1 is a plan view of a prior art starburst cutting die.

Referring first to FIG. 1, a prior art type starburst cutting die 10 is shown as including a cylindrical base block 12 with one rule or knife 14 extending across the full diameter of the block 12 through the center point 16 of the desired starburst pattern.

Six additional knives 18, 20, 22, 24, 26 and 28 of lengths corresponding to radii of the desired starburst pattern are radially and symmetrically disposed in the face of the base block 12 about the center point 16 of the desired starburst pattern.

Figure 2:
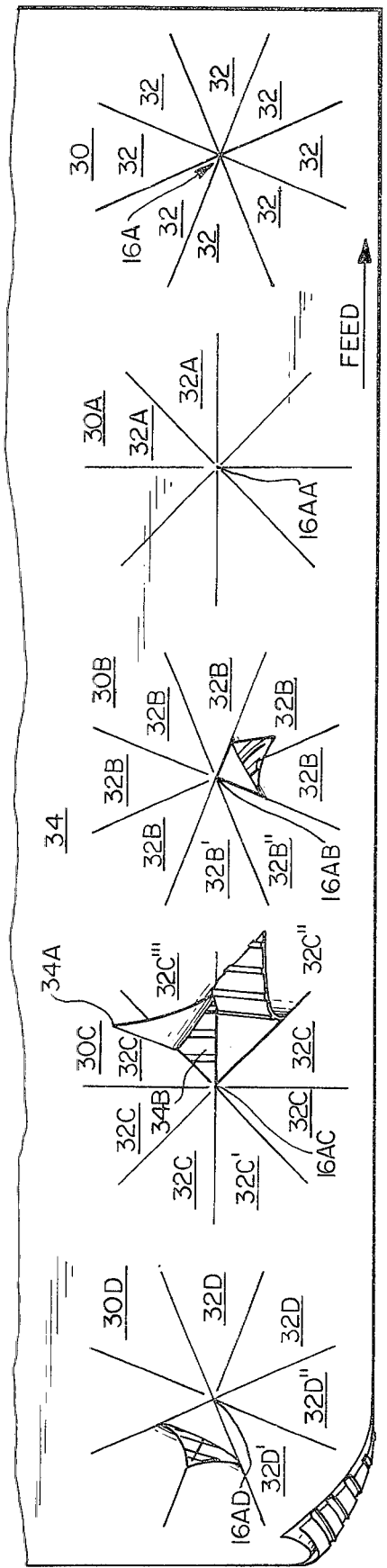
FIG. 2 is a perspective of a prior art starburst pattern cut in a sheet of single faced corrugated sheet stock illustrating the lack of complete die cutting in some of the starburst patterns.

As shown in FIG. 2, the starburst pattern 30 has rays or leaves 32 which converge at the center point 16A thereof in a plurality of sharp apices.

In order to effectuate a complete cut through the center 16 of the starburst 30, the inboard tips 18A - - - 28A of the rules or knives 18 - - - 28, respectively, must abut the diametric rule or knife 14 at the center point 16 in the die configuration 10 and be mutually juxtaposed with the tips of those knives adjacent thereto on the same side of the diametric knife 14.

Thus, in order to make a clean narrow cut to a common point 16A in the starburst pattern 30, these rules or knives 18 - - - 28 must have their respective inboard ends 18A - - - 28A so tapered as to conform to the starburst pattern 30 so they will meet and form a small center point 16A therein and in order that they will offer the least resistance to piercing of the sheet stock and not tear or distort the same. These facts precludes joining of the blades at the center 16 and results in a tendency to warp and dull rapidly necessitating frequent change and down-time of the related production machinery.

FIG. 2 illustrates a strip or partial strip of sheet stock 34, such as single-faced corrugated material, in which the FEED direction of the stock through a rotary die cutting machine is indicated by the arrow so labelled and in which representative prior art starburst patterns 30, 30A, 30B, 30C and 30D are shown.

These starbursts 30, 30A - - - 30D are made up, respectively, of rays or leaves 32, 32A - - - 32D converging at center points 16A, 16AA - - - 16AD.

It is in FIG. 2 that problems of the prior art become graphically apparent.

In the starburst 30, the full desired cut for each of the rays 32 is accomplished such that they converge at the center point 16A but are all free to move at their innermost extremities.

In the starburst 30A, on the other hand, the very next die cut effected by the feed direction of the stock 34, all of the rays 32A have failed to receive full cuts and are all pinned together at the center point 16AA.

In the next-cut starburst 30B, the rays 32B' and 32B" are the only ones properly cut, all of the other rays 32B of the starburst 30B being improperly joined toward their innermost extremities with one or more adjacent rays.

In the next-cut starburst 30C, the rays 32C' and 32C" are properly cut through, the top layer or face 34A of the stock 34 is properly cut through at the ray 32C''' but the lower or corrugated portion 34B is not, and the remaining rays 32B are improperly joined to one or more adjacent rays toward their innermost extremities.

In the next-cut starburst pattern 30D, adjsent rays 32D' and 32D" are properly cut through but all of the remaining rays 32D are only cut through in the form of three pairs of rays, the individual rays of each pair being joined together at their innermost extremities.

Such graphic inconsistencies and lack of quality control in the prior art is obviated by the present invention as will now be described in detail.

Figure 3:
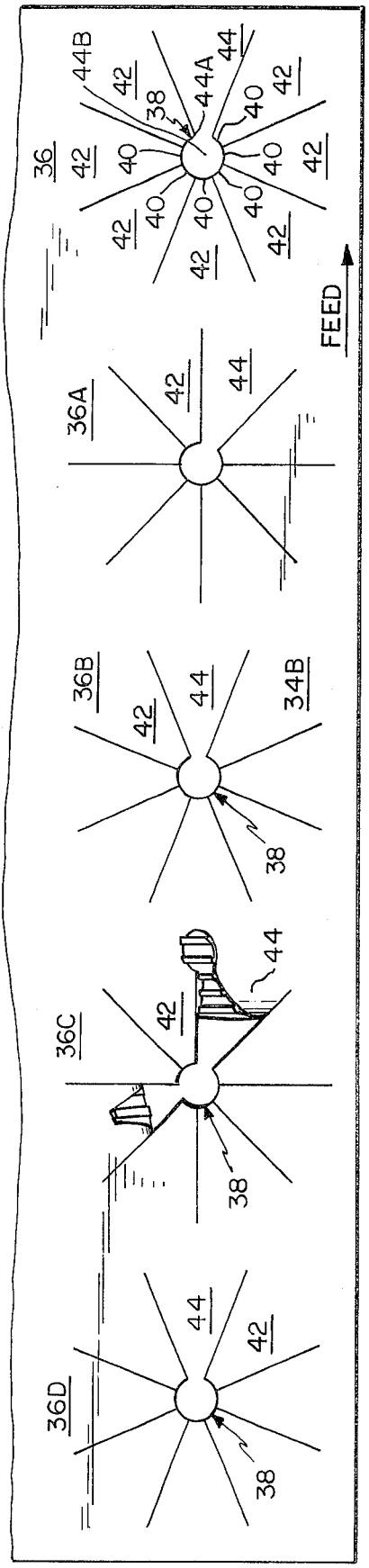
FIG. 3 is a perspective of similar sheet stock with the starburst pattern of the present invention showing the uniformity of cut achieved by the die and starburst configuration of the present invention.

Referring now to FIG. 3, the starburst pattern 36 of the present invention is shown as including an arcuate central port or opening 38 defined except for one arcuate span thereof by adjacent arcuate inner ends 40 of the starburst rays or leaves 42, the said arcuate inner ends 40 defining adjacent portions of the circumference of the central arcuate port 38.

The undefined arcuate peripheral portion of the center port 38 is broken by the necked-down portion 44A of a keyhole shaped ray 44 which further includes a cut-out portion 44B conformal to the arcuate center port 38 integrally affixed to the innermost end of the ray 44 at the neck-down portion 44A thereof.

In viewing FIG. 3, the uniformity of the successively cut starburst patterns 36, 36A, 36B, 36C and 36D of the present invention becomes readily apparent.

In stark contrast to the same general sequence of starburst cuts shown in FIG. 2, the sequence of FIG. 3 shows complete uniformity with all of the rays 42 and their associated keyhole-shaped rays 44 being completely cut through to the center port 38 such that each ray of each starburst is completely free of its adjacent rays.

Figure 4:
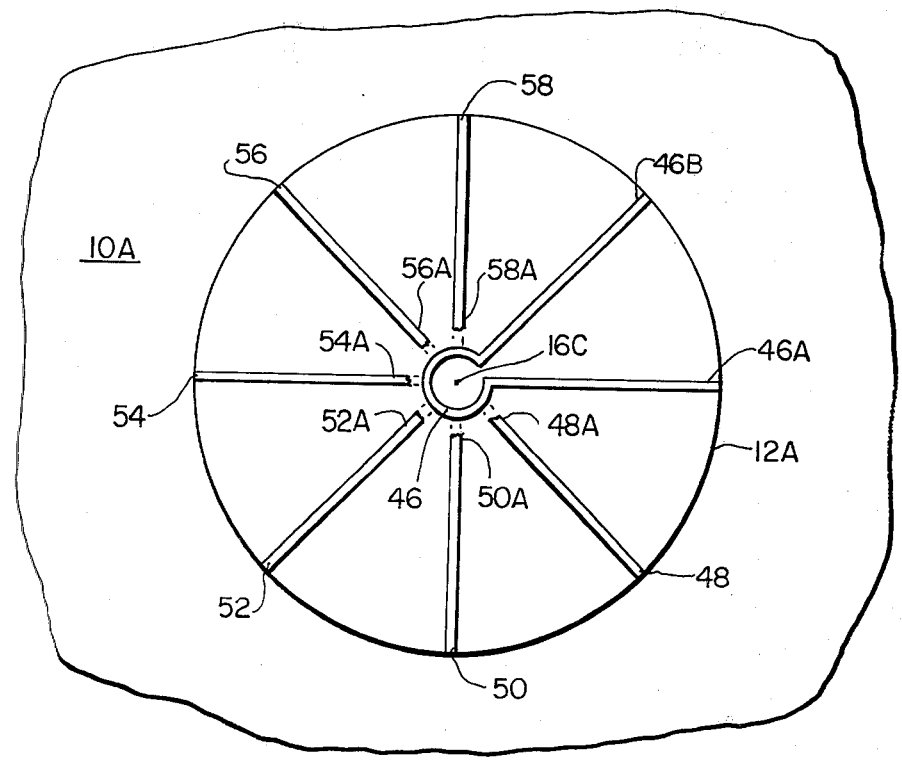
FIG. 4 is a plan view of the base block and cutting edge configuration of the starburst die of the present invention.

The novel die structure 10A for the starburst design 36 is shown in FIG. 4 as including a base block 12A of a cylindrical configuration in which is embedded a partially cylindrical rule or knife 46 partially circumscribing the center 16C of the die pattern and defining the cutting edge which results in the arcuate central port 40 being formed in the starburst patterns 36 of stock 34B of FIG. 3.

A segment of the arc circumscribed by the central rule or knife 46 is open and from opposite ends of this open arc, respectively, radial rules or knives 46A and 46B extend to the outer periphery of the base block 12A of the die 10A.

In the configuration shown, the central rule or knife 46 has its cutting edge formed in a partial circle with cylindrical side walls coterminate therewith.

A plurality of additional radially extending rules or knives (six for example) 48, 50, 52, 54, 56 and 58 are disposed about the arcuate periphery of the central rule 46 with the respective interior ends 48A - - - 58A thereof in butting engagement with the said cylindrical sidewalls of the central rule 46.

In this configuration no tapering or alteration of the rules 48 - - - 58 is required to make the requisite starburst pattern cuts through the sheet stock 34B. As a result, the life of the dies 10A is materially enhanced and the problems of the prior art dies 10 are obviated.

The interior ends 48A - - - 58A of the knives 48 - - - 58 now being in a flat untapered condition results in increased strength, rigidity, and resistance to dulling and warping. Furthermore, this configuration assures positive cut-through of the sheet stock at higher cutting speeds than could be utilized with prior art devices.

It should be noted that in FIGS. 2 and 4 there is an exaggerated gap at the interior ends of the radial knives (although they actually abut with the various related knives previously described) to better illustrate the configuration of the said interior ends.

From the foregoing description it can now be readily seen that the present invention satisfies a long felt need in the art, materially enhances the efficiency of production and substantially eliminates the undesirable characteristics and resulting loss of the finished product heretofore so prevalent in the prior art.

It is to be understood that the present invention may be modified as would occur to one of ordinary skill in the art without departing from the spirit and scope of this invention.

I claim:

1. A package liner for fragile articles, comprising:
sheet stock incised with starburst patterns predictably cut through sheet stock providing completely cut through starburst patterns without waste material, each of said starburst patterns nestably receiving said articles comprising a circular pattern of convergent rays of said sheet stock separated by substantially radially disposed slots formed through the sheet stock therebetween, all but one of said rays and the said slots defined therebetween terminating in arcuate inwardly facing edge portions, said edge portions thereby defining the major portion of the outer periphery of an arcuate port through said sheet stock at substantially the center of said starburst pattern, and one substantially keyhole shaped ray having an enlarged inner edge portion cut out of the convergent rays of the said stock conformally shaped with said arcuate port, said enlarged inner edge portion and said rays of each pattern being completely and predictably cut through with no waste material.

2. The invention defined in claim 1, wherein each layer of said sheet stock includes an array of said starburst patterns for nestably receiving a plurality of articles therein.

3. The invention defined in claim 1, wherein said all but one of said rays are symmetrically and uniformly shaped such that said arcuate end portions thereof define the major portion of a circular outer periphery for said port.

4. The invention defined in claim 3, wherein each layer of said sheet stock is corrugated on one side and includes an array of said starburst patterns for nestably receiving a plurality of articles therein.

* * * * *